(12) United States Patent
Cho

(10) Patent No.: US 9,312,778 B2
(45) Date of Patent: Apr. 12, 2016

(54) POWER SUPPLY DEVICE

(71) Applicant: Samsung Electro-Mechanics, Co., Ltd., Suwon, Gyunggi-do (KR)

(72) Inventor: Young Jin Cho, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 281 days.

(21) Appl. No.: 14/024,205

(22) Filed: Sep. 11, 2013

(65) Prior Publication Data

US 2014/0369076 A1 Dec. 18, 2014

(30) Foreign Application Priority Data

Jun. 14, 2013 (KR) .................... 10-2013-0068495

(51) Int. Cl.
*H02M 3/335* (2006.01)
*H02M 3/337* (2006.01)
*H02M 1/00* (2007.01)

(52) U.S. Cl.
CPC ............ *H02M 3/3376* (2013.01); *H02M 3/335* (2013.01); *H02M 2001/0032* (2013.01)

(58) Field of Classification Search
CPC ............ H02M 3/335; H02M 3/33569; H02M 2011/0032
USPC .................................. 363/17, 21.02, 98, 132
See application file for complete search history.

(56) References Cited

U.S. PATENT DOCUMENTS

| | | | | |
|---|---|---|---|---|
| 8,541,997 | B2* | 9/2013 | Jiang et al. | 323/282 |
| 2012/0014152 | A1* | 1/2012 | Nakamura et al. | 363/126 |
| 2013/0026975 | A1* | 1/2013 | Liu et al. | 320/107 |
| 2014/0355313 | A1* | 12/2014 | Nishikawa | 363/17 |

FOREIGN PATENT DOCUMENTS

| | | |
|---|---|---|
| JP | 2003-018857 A | 1/2003 |
| JP | 2011-151949 A | 8/2011 |

* cited by examiner

*Primary Examiner* — Matthew Nguyen
(74) *Attorney, Agent, or Firm* — McDermott Will & Emery LLP

(57) ABSTRACT

A power supply device includes a full-bridge circuit including first to fourth switches switching power input from a power input unit, the first and second switches and the third and fourth switches being connected to both terminals of the power input unit in parallel; a resonance unit connected between a first connection node between the first and second switches and a second connection node between the third and fourth switches; a transformer including primary and secondary windings connected to the resonance unit in series; a rectifying circuit rectifying and outputting voltage transferred from the secondary winding; a sensing unit obtaining at least one of output current and output voltage output from the rectifying circuit; and a controlling unit controlling the first to third switches or the second to fourth switches, based on the at least one of the output current and the output voltage obtained by the sensing unit.

2 Claims, 4 Drawing Sheets

POWER SUPPLY DEVICE

CROSS-REFERENCE TO RELATED APPLICATION

This application claims the priority of Korean Patent Application No. 10-2013-0068495 filed on Jun. 14, 2013, with the Korean Intellectual Property Office, the disclosure of which is incorporated herein by reference.

BACKGROUND OF THE INVENTION

1. Field of the Invention

The present invention relates to a power supply device having improved output efficiency in a light load region.

2. Description of the Related Art

Generally, in order to drive an electronic apparatus, a power supply device supplying driving power required for driving is required.

Among power supply devices, a resonance type LLC direct current-to-direct current (DC/DC) converter may supply a predetermined amount of power to a load according to frequency using resonance characteristics. However, in the case in which the LLC DC/DC converter supplies the power to a light load, the LLC DC/DC converter is controlled in a high frequency region. That is, in the light load region, as a control frequency of the LLC DC/DC converter is increased, switching loss of a switching element may be sharply increased and loss caused by alternating current impedance may be increased due to skin effect occurring in a transformer, a coil, or the like.

The following related art documents 1 and 2 disclose a method of driving a light load, but do not disclose a switching control method corresponding to that suggested in the present disclosure.

RELATED ART DOCUMENT (Patent Document 1) Japanese Patent Laid-Open Publication No. JP 2003-018857
(Patent Document 2) Japanese Patent Laid-Open Publication No. JP 2011-151949

SUMMARY OF THE INVENTION

An aspect of the present invention provides a full-bridge converter capable of decreasing switching loss in a light load region.

Another aspect of the present invention provides a full-bridge converter capable of decreasing magnetic material loss in a light load region.

According to an aspect of the present invention, there is provided a power supply device, including: a full-bridge circuit including first to fourth switches switching power input from a power input unit, the first and second switches being connected to both terminals of the power input unit in parallel and the third and fourth switches being connected to both terminals of the power input unit in parallel; a resonance unit connected between a first connection node between the first switch and the second switch and a second connection node between the third switch and the fourth switch; a transformer including a primary winding and a secondary winding connected to the resonance unit in series; a rectifying circuit rectifying and outputting a voltage transferred from the secondary winding; a sensing unit obtaining at least one of an output current and an output voltage output from the rectifying circuit; and a controlling unit controlling the first to third switches provided in the full-bridge circuit or controlling the second to fourth switches provided in the full-bridge circuit, based on the at least one of the output current and the output voltage obtained by the sensing unit.

The controlling unit may control the first to third switches provided in the full-bridge circuit or control the second to fourth switches provided in the full-bridge circuit when the at least one of the output current and the output voltage has a predetermined value or less.

The controlling unit may turn the first switch and the third switch on and turn the second switch off at a first interval, and may turn the first switch and the third switch off and turn the second switch on at a second interval.

The controlling unit may turn the fourth switch off.

The controlling unit may turn the second switch and the fourth switch on and turn the third switch off at a first interval, and turn the second switch and the fourth switch off and turn the third switch on at a second interval.

The controlling unit may turn the first switch off.

According to another aspect of the present invention, there is provided a power supply device, including: a power unit including a full-bridge circuit having a plurality of switches switching input power and a transformer receiving the switched power, the plurality of switches transferring the switched power to the transformer and the transformer transforming and outputting the transferred power into output power having a preset voltage level; a sensing unit obtaining at least one of an output current and an output voltage of the power unit; and a controlling unit turning off at least one of the plurality of switches provided in the full-bridge circuit based on the at least one of the output current and the output voltage obtained by the sensing unit.

The full-bridge circuit may include first, second, third, and fourth switches, and the controlling unit may control the first to third switches provided in the full-bridge circuit or control the second to fourth switches provided in the full-bridge circuit, based on the at least one of the output current and the output voltage obtained by the sensing unit.

The controlling unit may control the first to third switches provided in the full-bridge circuit or control the second to fourth switches provided in the full-bridge circuit when the at least one of the output current and the output voltage has a predetermined value or less.

The controlling unit may turn the first switch and the third switch on and turn the second switch off at a first interval, and may turn the first switch and the third switch off and turn the second switch on at a second interval.

The controlling unit may turn the fourth switch off.

The controlling unit may turn the second switch and the fourth switch on and turn the third switch off at a first interval, and may turn the second switch and the fourth switch off and turn the third switch on at a second interval.

The controlling unit may turn the first switch off.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
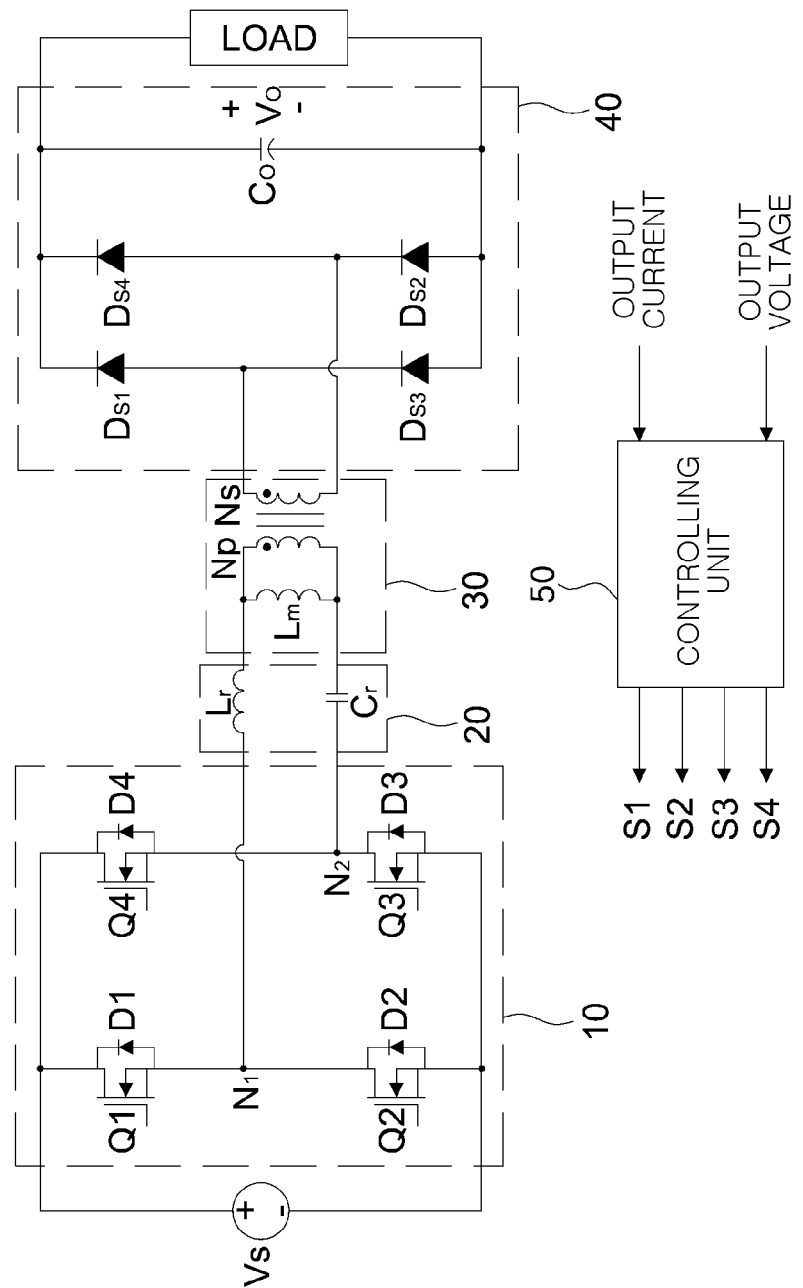
FIG. 1 is a circuit diagram showing a power supply device according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Throughout the drawings, the same or like reference numerals will be used to designate the same or like elements.

FIG. 1 is a circuit diagram showing a power supply device according to an embodiment of the invention.

Referring to FIG. 1, the power supply device may include a power input unit Vs, a full-bridge circuit 10, a resonance unit 20, a transformer 30, a rectifying circuit 40, a controlling unit 50, and a sensing unit.

The power input unit Vs may supply input power to the full-bridge circuit 10. The input power may be direct current (DC) power.

The full-bridge circuit 10 may include first to fourth switches Q1 to Q4. The first switch Q1 and the second switch Q2 may be connected to each other in series. In addition, the third switch Q3 and the fourth switch Q4 may be connected to each other in series. In addition, the first switch Q1 and the second switch Q2 may be connected to each other in parallel between a positive terminal and a negative terminal of the power input unit transferring the input power, and the fourth switch Q4 and the third switch Q3 may be connected to each other in parallel between the positive terminal and the negative terminal of the power input unit.

The full-bridge circuit 10 may switch the power input from the power input unit Vs and transfer the switched input power to the transformer 30.

Meanwhile, a connection point between the first switch Q1 and the second switch Q2 is defined as a first connection node N1. In addition, a connection point between the fourth switch Q4 and the third switch Q3 is defined as a second connection node N2.

The resonance unit 20 may be provided between the first connection node N1 and the second connection N2.

The resonance unit 20 may include a resonant inductor Lr and a resonant capacitor Cr.

The transformer 30 may include a primary winding Np and a secondary winding Ns, each having a preset amount of turns.

The primary winding Np may be electrically connected between the first connection node N1 and the second connection node N2, and the secondary winding Ns may form a preset turn ratio with the primary winding Np to thereby transform and output the switched power input to the primary winding Np.

The resonant inductor Lr, the primary winding Np, and the resonant capacitor Cr may be connected to one another in series.

Meanwhile, the power input unit Vs, the full-bridge circuit 10, the resonance unit 20, and the transformer 30 are collectively known as a power unit.

The rectifying circuit 40 may include bridge diodes Ds1 to Ds4 and an output capacitor Co.

The bridge diodes Ds1 to Ds4 may be configured of four diodes Ds1 to Ds4, and the first and third diodes Ds1 and Ds3 may be connected to each other in series. In addition, the fourth and second diodes Ds4 and Ds2 may be connected to each other in series, and may be connected to the first and third diodes Ds1 and Ds3 in parallel.

The secondary winding Ns may be electrically connected between a connection terminal of the first and third diodes Ds1 and Ds3 and a connection terminal of the fourth and second diodes Ds4 and Ds2. Therefore, the bridge diodes Ds1 to Ds4 may full-wave or half-wave rectify the power transferred from the secondary winding.

The output capacitor Co may stabilize and output the rectified power from the bridge diodes Ds1 to Ds4.

The sensing unit may obtain an output current and an output voltage from the rectifying circuit 40.

The controlling unit 50 may control the first to third switches Q1 to Q3 provided in the full-bridge circuit based on the output current and the output voltage obtained by the sensing unit. In this case, the controlling unit 50 may turn the fourth switch Q4 off.

Specifically, in the case in which the load connected to the power supply device is a light load, the controlling unit 50 may turn the fourth switch Q4 provided in the full-bridge circuit off and control the first to third switches Q1 to Q3 provided in the full-bridge circuit.

Here, the case in which only one of switching elements Q1 and Q4 provided on a high side of the full-bridge circuit is controlled in a state in which the other one of the switching elements Q1 and Q4 is turned off is defined as an 'asymmetrical control.'

In addition, the controlling unit 50 may determine that the power supply device is connected to the light load, in the case that at least one of the output current and the output voltage has a predetermined value or less. The predetermined value may appropriately be selected, if necessary.

In addition, the controlling unit 50 may control the second to fourth switches Q2 to Q4 provided in the full-bridge circuit based on the output current and the output voltage obtained by the sensing unit. In this case, the controlling unit 50 may turn the first switch Q1 off.

Specifically, in the case in which the load connected to the power supply device is a light load, the controlling unit 50 may turn the first switch Q1 provided in the full-bridge circuit off and control the second to fourth switches Q2 to Q4 provided in the full-bridge circuit.

That is, the power supply device may perform an asymmetrical control in the light load region.

Figure 2:
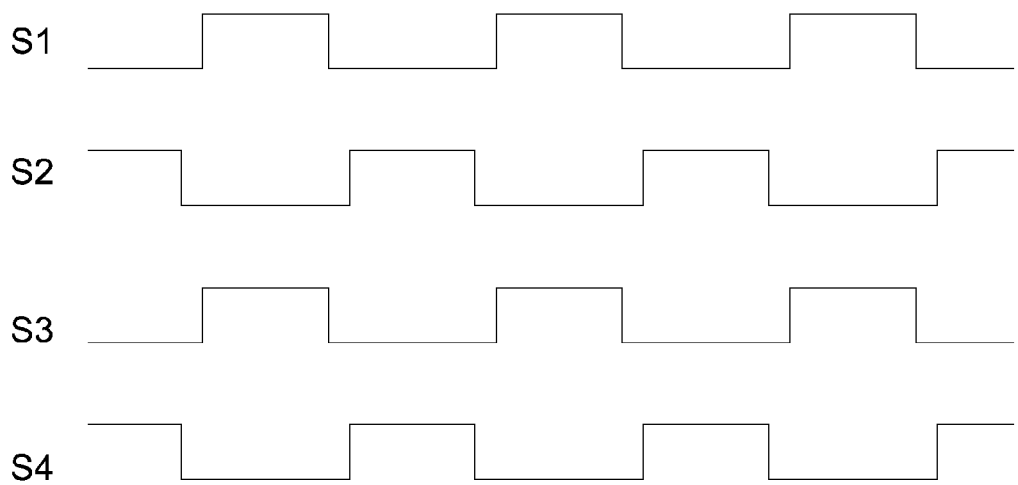
FIG. 2 is a diagram illustrating a method of controlling a general resonance type LLC DC/DC converter.

FIG. 2 is a diagram illustrating a method of controlling a general resonance type LLC DC/DC converter.

Referring to FIGS. 1 and 2, the first to fourth switches Q1 to Q4 are turned on or off according to switch control signals S1 to S4 applied to gate-to-source terminals of the first to fourth switches Q1 to Q4.

That is, at a first interval, the first switch Q1 and the third switch Q3 may be turned on (ON) by the first switch control signal S1 and the third switch control signal S3. In this case, the second switch Q2 and the fourth switch Q4 may be turned off (OFF) by the second switch control signal S2 and the fourth switch control signal S4.

In addition, at a second interval, the second switch Q2 and the fourth switch Q4 may be turned on (ON) by the second switch control signal S2 and the fourth switch control signal S4. In this case, the first switch Q1 and the third switch Q3 may be turned off (OFF) by the first switch control signal S1 and the third switch control signal S3.

Thereafter, the foregoing switching operations may be repeated.

Figure 3:
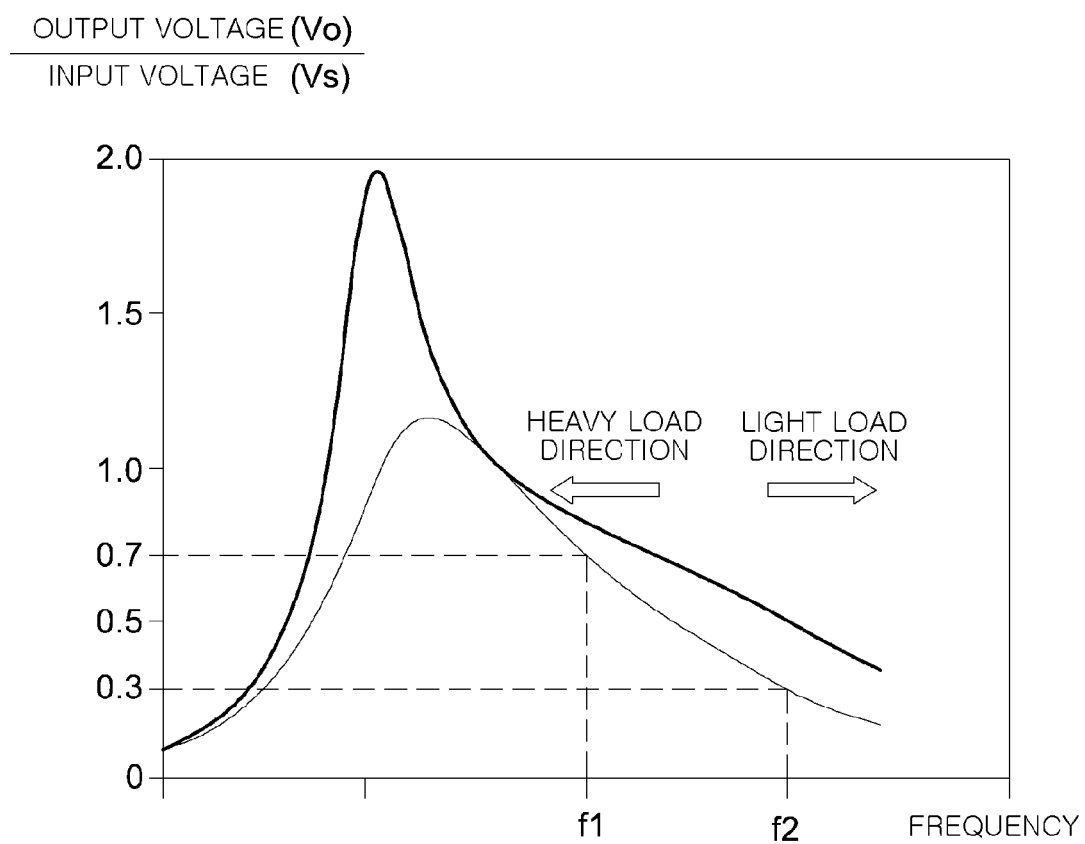
FIG. 3 is a diagram illustrating an output ratio (output voltage/input voltage) according to frequency in a general resonance type LLC DC/DC converter.

FIG. 3 is a diagram illustrating an output ratio (output voltage/input voltage) according to frequency in a general resonance type LLC DC/DC converter.

The resonance type LLC DC/DC converter may adjust the output ratio according to frequency using resonance characteristics.

Referring to FIG. 3, in the case in which a power supply device needs to drive a light load, a resonance frequency needs to be increased based on a predetermined frequency f1.

For example, when an input DC voltage is 100V, a switching element needs to be driven at the first frequency f1 in order to produce the output of 70V, but the power element needs to be driven at a second frequency f2 in order to produce the output of 30V.

However, in a light load region, as the frequency of the LLC DC/DC converter is increased, switching loss of the switching element is sharply increased. In addition, general passive elements (e.g., a transformer, a resonant coil, and the like) may have alternating current (AC) impedance, sharply increased due to skin effect according to frequency. In addition, winding loss may be increased according to the alternating current impedance. That is, in the light load region, the resonance type LLC DC/DC converter may increase the loss caused by the alternating current impedance due to the skin effect of the transformer, the coil, or the like.

Figure 4:
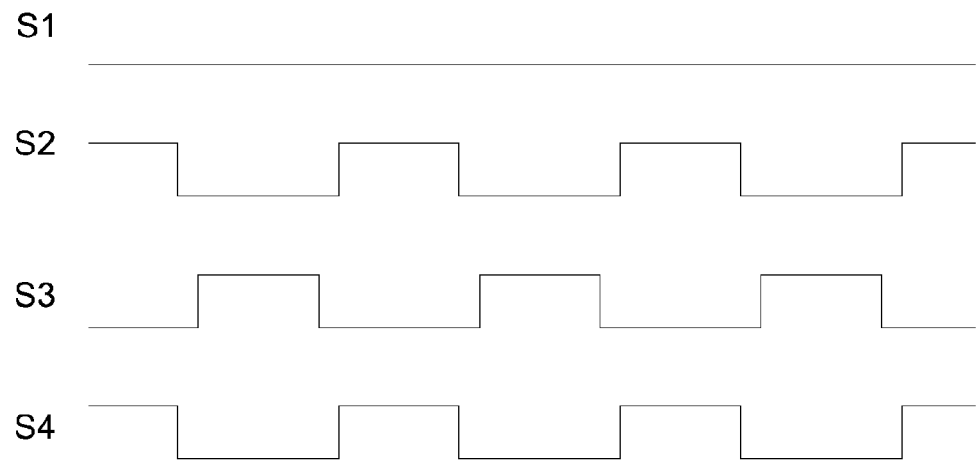
FIG. 4 is a diagram illustrating a method of controlling a resonance type LLC DC/DC converter according to an embodiment of the present invention.

FIG. 4 is a diagram illustrating a method of controlling a resonance type LLC DC/DC converter according to an embodiment of the invention.

Referring to FIGS. 1 and 4, the controlling unit 50 may determine whether or not the load connected to the power supply device is a light load based on at least one of the output current and the output voltage obtained by the sensing unit. Specifically, the controlling unit 50 may determine that the power supply device is connected to the light load, in the case that at least one of the output current and the output voltage has a predetermined value or less. The predetermined value may be appropriately selected, if necessary.

In the case that the controlling unit 50 does not determine a load connection state as a light load state, the power supply device may be driven according to the method of controlling the general resonance type LLC DC/DC converter. For example, the power supply device may be driven by control waveforms shown in FIG. 2.

In the case that the controlling unit 50 determines the load connection state as the light load state, the power supply device may be driven by control waveforms shown in FIG. 4.

That is, according to the embodiment of the invention, the controlling unit 50 may control the second to fourth switches provided in the full-bridge circuit based on one of the output current and the output voltage obtained by the sensing unit. In this case, the controlling unit 50 may turn the first switch off.

At a first interval, the second switch Q2 and the fourth switch Q4 may be turned on (ON) by the second switch control signal S2 and the fourth switch control signal S4. In this case, the third switch Q3 may be turned off (OFF) by the third switch control signal S3.

In addition, at a second interval, the third switch Q3 may be turned on (ON) by the third switch control signal S3. In this case, the second switch Q2 and the fourth switch Q4 may be turned off (OFF) by the second switch control signal S2 and the fourth switch control signal S4.

Thereafter, the foregoing switching operations may be repeated.

Meanwhile, the first switch may be turned off (OFF) at the first interval and the second interval.

That is, the power supply device may perform the asymmetrical control in the light load region.

At the first interval, the second switch Q2 and the fourth switch Q4 may be turned on (ON), the third switch Q3 and the fourth switch Q4 may be turned off, and the full-bridge circuit may transfer the direct current provided from the power input unit Vs to the resonance unit 20 and the transformer 30. Thereby, the resonance unit 20 may have energy accumulated therein and the energy may be transferred to the secondary winding Ns of the transformer 30.

At the second interval, the third switch Q3 may be turned on, the first switch Q1, the second switch Q2, and the fourth switch Q4 may be turned off, and the full-bridge circuit may transfer the energy stored in the resonance unit 20 to the transformer 30. Thereby, the energy may be transferred to the secondary winding Ns of the transformer 30.

In the case that the power supply device is driven asymmetrically, it may be controlled at a frequency lower than that of the general resonance type LLC DC/DC converter.

In this case, according to the embodiment of the invention, since a switching frequency of the switching element is decreased, switching loss may be decreased. In addition, the alternating current impedance of the windings of the transformer, the resonant coil, and the like is decreased, such that winding loss may be decreased.

Figure 5:
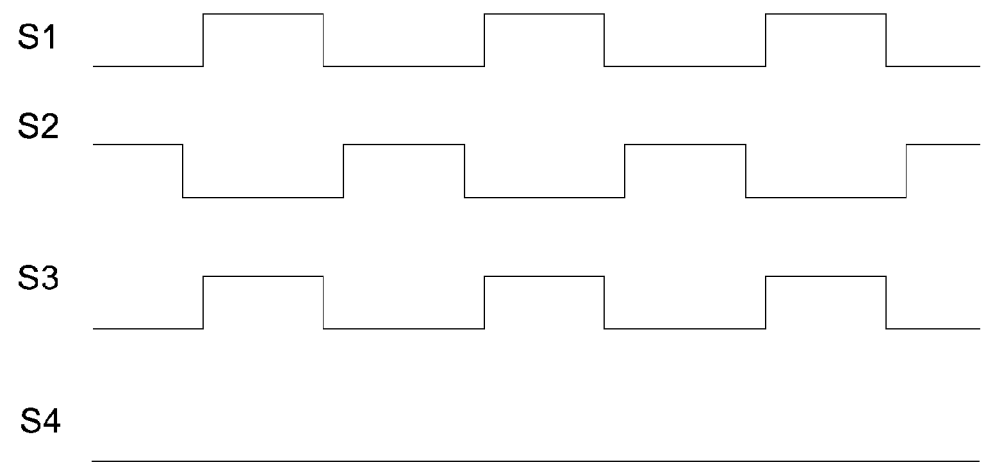
FIG. 5 is a diagram illustrating a method of controlling a resonance type LLC DC/DC converter according to another embodiment of the present invention.

FIG. 5 is a diagram illustrating a method of controlling a resonance type LLC DC/DC converter according to another embodiment of the invention.

Referring to FIGS. 1 and 5, the controlling unit 50 may determine whether or not the load connected to the power supply device is a light load based on at least one of the output current and the output voltage obtained by the sensing unit. Specifically, the controlling unit 50 may determine that the power supply device is connected to the light load, in the case that at least one of the output current and the output voltage has a predetermined value or less. The predetermined value may appropriately be selected, if necessary.

In the case that the controlling unit 50 does not determine a load connection state as a light load state, the power supply device may be driven according to the method of controlling the general resonance type LLC DC/DC converter. For example, the power supply device may be driven by control waveforms shown in FIG. 2.

In the case that the controlling unit 50 determines the load connection state as the light load state, the power supply device may be driven by control waveforms shown in FIG. 5.

That is, according to the embodiment of the invention, the controlling unit 50 may control the first to third switches provided in the full-bridge circuit based on one of the output current and the output voltage obtained by the sensing unit. In this case, the controlling unit 50 may turn the fourth switch off.

At the first interval, the first switch Q1 and the third switch Q3 may be turned on (ON) by the first switch control signal S1 and the third switch control signal S3. In this case, the second switch Q2 may be turned off (OFF) by the second switch control signal S2.

In addition, at the second interval, the second switch Q2 may be turned on (ON) by the second switch control signal S2. In this case, the first switch Q1 and the third switch Q3 may be turned off (OFF) by the first switch control signal S1 and the third switch control signal S3.

Thereafter, the foregoing switching operations may be repeated.

Meanwhile, the fourth switch may be turned off (OFF) at the first interval and the second interval.

That is, the power supply device may perform the asymmetrical control in the light load region.

At the first interval, the first switch Q1 and the third switch Q3 may be turned on (ON), the second switch Q2 and the fourth switch Q4 may be turned off, and the full-bridge circuit may transfer the direct current provided from the power input unit Vs to the resonance unit 20 and the transformer 30. Thereby, the resonance unit 20 may have energy accumulated therein and the energy may be transferred to the secondary winding Ns of the transformer 30.

At the second interval, the second switch Q2 may be turned on, the first switch Q1, the second switch Q2, and the third switch Q3 may be turned off, and the full-bridge circuit may transfer the energy stored in the resonance unit 20 to the transformer 30. Thereby, the energy may be transferred to the secondary winding Ns of the transformer 30.

In the case that the power supply device is driven asymmetrically, it may be controlled at a frequency lower than that of the general resonance type LLC DC/DC converter.

In the case of the method of controlling the general resonance type LLC DC/DC converter, a frequency control of 123.6 kHz is required in order to obtain an output voltage of 250V for an input voltage of 400V.

On the other hand, in the case of the method of controlling the resonance type LLC DC/DC converter according to the embodiment of the invention, a frequency control of 49.32 kHz is required in order to obtain an output voltage of 250V for an input voltage of 400V.

In addition, in the case of the method of controlling the general resonance type LLC DC/DC converter, a frequency control of 245 kHz is required in order to obtain an output voltage of 150 V for an input voltage of 400V.

On the other hand, in the case of the method of controlling the resonance type LLC DC/DC converter according to the embodiment of the invention, a frequency control of 84.97 kHz is required in order to obtain an output voltage of 150 V for an input voltage of 400V.

As such, the method of controlling the resonance type LLC DC/DC converter according to the embodiment of the invention may perform a low-frequency control in the light load region.

Therefore, according to the embodiment of the invention, since the switching frequency of the switching element is decreased in the light load region, switching loss may be decreased. In addition, the alternating current impedance of the windings of the transformer, the resonant coil, and the like is decreased, such that winding loss may be decreased.

As set forth above, according to embodiments of the invention, a full-bridge converter may decrease switching loss in a light load region.

In addition, according to embodiments of the invention, a full-bridge converter may decrease magnetic material loss in a light load region.

While the present invention has been shown and described in connection with the embodiments, it will be apparent to those skilled in the art that modifications and variations can be made without departing from the spirit and scope of the invention as defined by the appended claims.

What is claimed is:

1. A power supply device, comprising:
a full-bridge circuit including first to fourth switches switching power input from a power input unit, the first and second switches being connected to both terminals of the power input unit in parallel and the third and fourth switches being connected to the terminals of the power input unit in parallel;
a resonance unit connected between a first connection node between the first switch and the second switch and a second connection node between the third switch and the fourth switch;
a transformer including a primary winding and a secondary winding connected to the resonance unit in series;
a rectifying circuit rectifying and outputting a voltage transferred from the secondary winding;
a sensing unit obtaining at least one of an output current and an output voltage output from the rectifying circuit; and
a controlling unit controlling the first to third switches provided in the full-bridge circuit or controlling the second to fourth switches provided in the full-bridge circuit when the at least one of the output current and the output voltage obtained by the sensing unit has a predetermined value or less,
wherein the controlling unit turns the first switch and the third switch on and turns the second switch off at a first interval, and turns the first switch and the third switch off and turns the second switch on at a second interval, and turns the fourth switch off at the first interval and the second interval, or
wherein the controlling unit turns the second switch and the fourth switch on and turns the third switch off at the first interval, and turns the second switch and the fourth switch off and turns the third switch on at the second interval, and turns the first switch off at the first interval and the second interval.

2. A power supply device, comprising:
a power unit including a full-bridge circuit having first to fourth switches switching input power and a transformer receiving the switched power, the plurality of switches transferring the switched power to the transformer and the transformer transforming and outputting the transferred power into output power having a preset voltage level;
a sensing unit obtaining at least one of an output current and an output voltage of the power unit; and
a controlling unit controlling the first to third switches provided in the full-bridge circuit or controlling the second to fourth switches provided in the full-bridge circuit when the at least one of the output current and the output voltage obtained by the sensing unit has a predetermined value or less,
wherein the controlling unit turns the first switch and the third switch on and turns the second switch off at a first interval, and turns the first switch and the third switch off and turns the second switch on at a second interval, and turns the fourth switch off at the first interval and the second interval, or
wherein the controlling unit turns the second switch and the fourth switch on and turns the third switch off at the first interval, and turns the second switch and the fourth switch off and turns the third switch on at the second interval, and turns the first switch off at the first interval and the second interval.

* * * * *